March 22, 1966  A. G. MORROW  3,241,619
PEANUT AND BEAN HARVESTER
Filed Oct. 17, 1963  4 Sheets-Sheet 1

INVENTOR
AUSTIN G. MORROW

BY *Kenney, Palmer, Stewart & Estabrook*

ATTORNEYS

March 22, 1966  A. G. MORROW  3,241,619
PEANUT AND BEAN HARVESTER
Filed Oct. 17, 1963  4 Sheets-Sheet 2

INVENTOR
AUSTIN G. MORROW

BY *Kenyon, Palmer, Stewart & Estabrook*

ATTORNEYS

March 22, 1966  A. G. MORROW  3,241,619
PEANUT AND BEAN HARVESTER
Filed Oct. 17, 1963  4 Sheets-Sheet 3
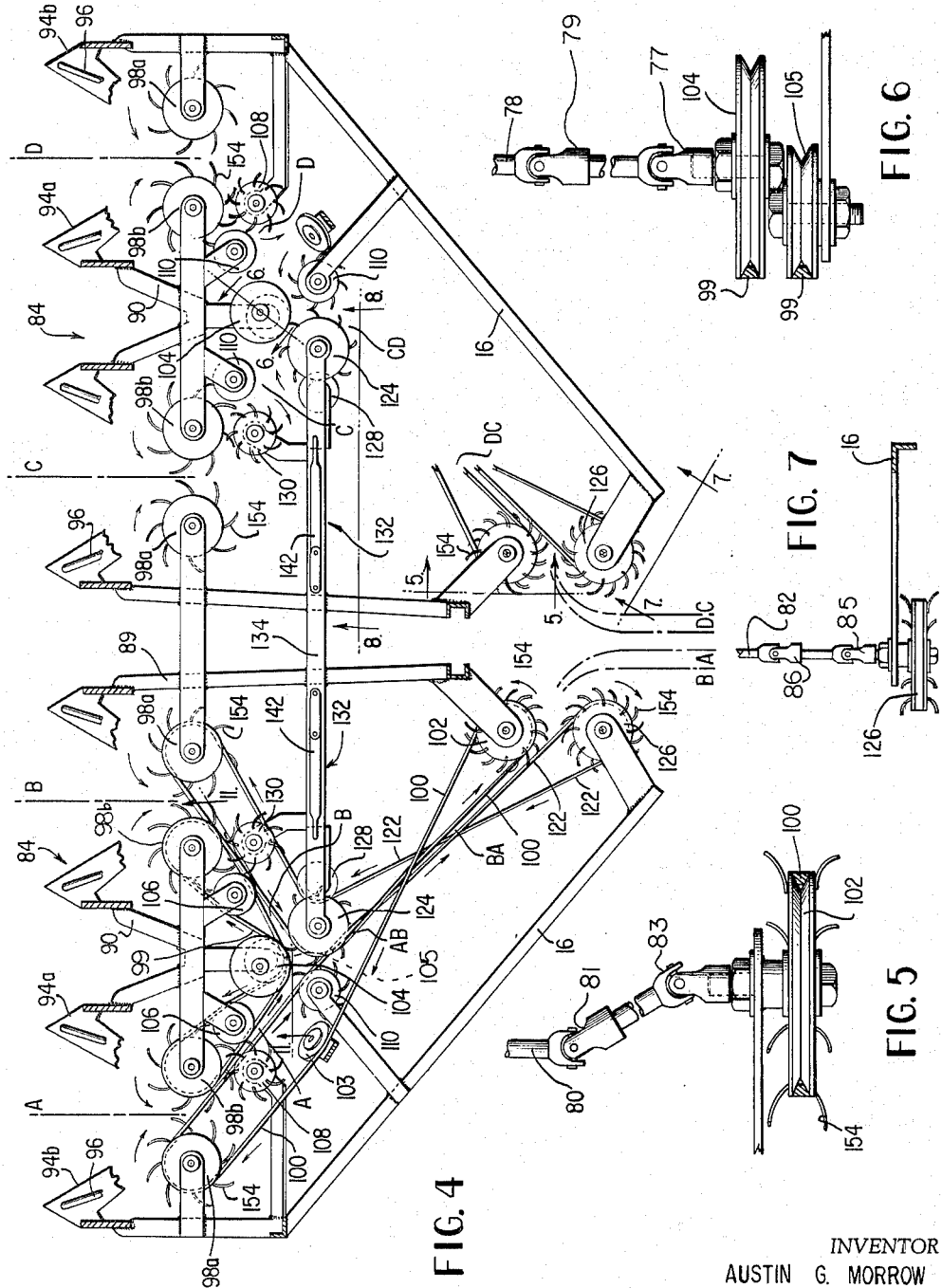
INVENTOR
AUSTIN G. MORROW
BY Kenyon, Palmer, Stewart & Estabrook
ATTORNEYS March 22, 1966  A. G. MORROW  3,241,619
PEANUT AND BEAN HARVESTER
Filed Oct. 17, 1963  4 Sheets-Sheet 4
FIG. 8
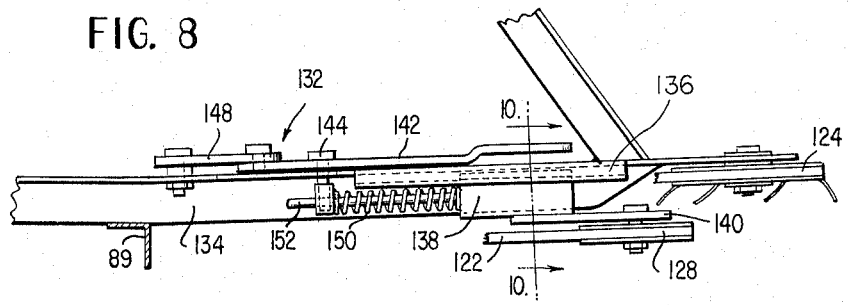
FIG. 9
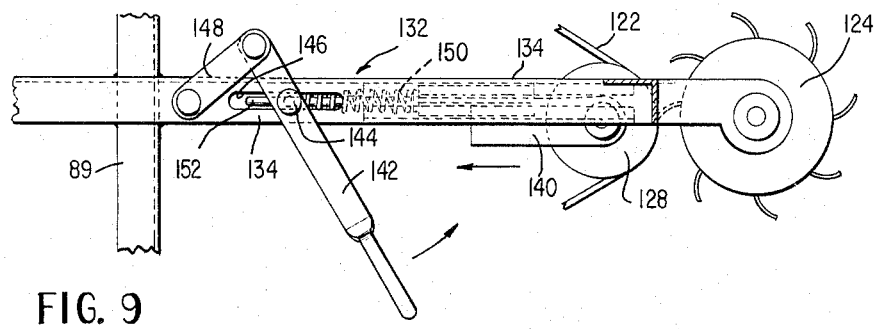
FIG. 11
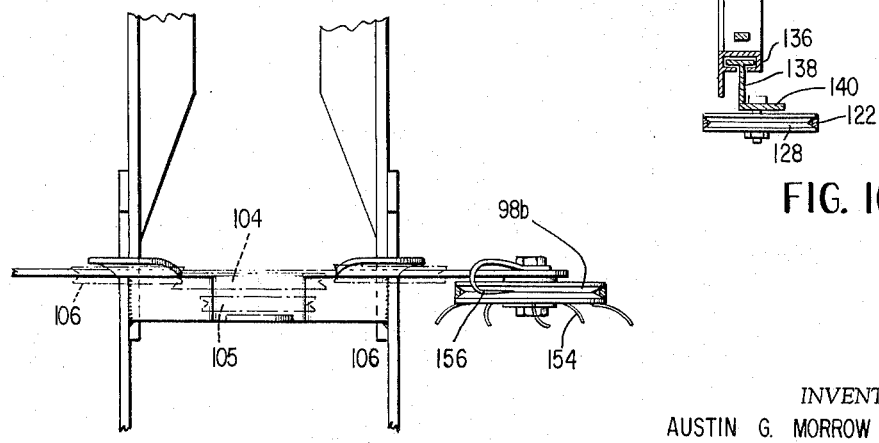
FIG. 10
INVENTOR
AUSTIN G. MORROW
BY *Kenon, Palmer, Stewart & Estabrook*
ATTORNEYS United States Patent Office 3,241,619
Patented Mar. 22, 1966

3,241,619
PEANUT AND BEAN HARVESTER
Austin G. Morrow, East Star Rte., Box 65A,
Portales, N. Mex.
Filed Oct. 17, 1963, Ser. No. 316,851
7 Claims. (Cl. 171—61)

This invention relates generally to plant harvesters and more particularly to a new and improved peanut harvester of a type especially adapted to handle peanuts of a fragile variety.

There have been and are at present many types of peanut harvesters in use throughout the country, the harvesters generally consisting of tractor-mounted or tractor-drawn mechanism having means, including a pair of plow-like knives to dig a row of peanuts. The harvesters further include gripping and conveying means for engaging the vines of the peanut plants and conveying the plants rearwardly and upwardly on the harvester for further processing. Most of the present day peanut harvesting machines also incorporate shaking or beating means for separating dirt and foreign materials from the peanut plant. Although these machines are satisfactory for use in harvesting many varieties of peanuts, special problems are involved in harvesting peanuts of fragile varieties such as the Valencia peanut. The Valencia-type peanut is primarily grown for roasting in the hull; and if the hulls of the peanuts are discolored, they are only of value for processing into oil. Even though the kernel of the peanut is unaffected by discoloration of the hull, non-discolored or bright peanuts sell on the open market for a much higher price than discolored peanuts. During harvesting, therefore, this variety of peanuts must be windrowed in an inverted condition to avoid discoloration. Furthermore, because of the weight and nature of the Valencia peanut, it is not adaptable to the digging and shaking equipment generally in use in other areas for harvesting other types of peanuts. One of the more important differences in the nature of the Valencia peanut plant is that it is more fragile than other types of plants and the nuts tend to shake loose from the vines under the handling of most peanut harvesters. For these reasons, the harvesting of the Valencia peanut has been and is now being done largely by hand. When the peanuts are gathered, they must be shocked in small shocks with the peanuts up for drying. Once the plants are shocked, they are left in that state until safe for storage after thrashing. Weather conditions and shortage of labor often cause great losses in the peanut crop due to the resulting delays in harvesting.

There have also been, in the past, several machines developed especially adapted to handle all types of peanuts including the above-described Valencia peanuts. A typical example of such a machine is disclosed in the U.S. Patent 3,024,849 to Gregory. For various reasons, these machines have not been found satisfactory and reliable in operation.

Another problem involved in the harvesting of peanuts in general and the Valencia peanut in particular, lies in the removal of the peanut plants from the ground. Under or during growth conditions, peanuts form around the base of the plant on spikes that come from joints in the plant limbs. During the growth of the vines, as the vines increase in size, their weight forces them closer to the ground. Spikes coming from the joints of the plant limb then enter the ground and the peanuts grow on each of the spikes. The peanuts and spikes vary in distance from the center of the row from a few inches to many inches. In the prior art, many peanut harvesters such as the harvester in the aforementioned patent to Gregory, have been constructed with their vine pickup rods forward of the knives used to separate the plants from the ground. A serious problem occurs in machines having this type of pickup in that the pickup rods, placed ahead of the plant separating knives, tend to lift the plant vine prior to the separation of the peanuts from the ground, thereby pulling the spike crop off when the vines are folded up and leaving a large portion of the spike crop remaining in the ground.

It is therefore an object of this invention to provide a peanut harvester and windrower which is especially adapted to harvest the Valencia variety of peanut as well as other types of peanuts.

It is a further object of this invention to provide a peanut harvester and windrower which will dig, handle and windrow multiple rows of peanut plants simultaneously.

It is another object of this invention to provide a peanut harvester and windrower which is especially adapted to handle fragile peanut plants of the Valencia type in such a way that a minimum amount of nuts are lost during the harvesting and windrowing process.

It is still another object of this invention to provide a peanut harvester and windrower which will harvest and windrow a plurality of rows of peanuts with the peanuts in the windrow in the inverted condition.

It is still another object of this invention to provide a peanut harvester and windrower which is rugged, efficient, and not subject to jamming or malfunctioning due to the ingestion of debris and other foreign material associated with dug peanut plants.

It is still further an object of this invention to provide a peanut harvester and windrower having conveying means especially adapted to handle a plurality of rows of peanut plants simultaneously and to consolidate the rows into a single windrow for curing of the crop.

It is yet a further object of this invention to provide a peanut harvester and windrower having means to consolidate, positively invert, and compact multiple rows of plants prior to discharging them therefrom into a windrow.

These and many of the other attendant objects will be come better understood by reference to the following detailed description in which like numerals indicate like parts throughout the drawings and wherein:

FIG. 4 is a top plan view of the harvester, with the upper drive mechanism thereof removed and the remaining mechanism partly broken away or removed in the interest of clarity showing a plan view detail of a portion of the conveyor belt system;

FIG. 5 is an elevational view of a portion of the device partially broken away and enlarged, taken along the lines 5—5 of FIG. 4;

FIG. 6 is a view similar to FIG. 5, taken along the lines 6—6 of FIG. 4;

FIG. 7 is a view similar to FIG. 5, taken along the lines 7—7 of FIG. 4;

FIG. 8 is an enlarged elevational view taken along the lines 8—8 of FIG. 4;

FIG. 9 is a plan view of the portion of the device shown in FIG. 8;

FIG. 10 is a view partly in section, taken along the lines 10—10 of FIG. 8;

FIG. 11 is an elevational view of a portion of the device taken along the lines 11—11 of FIG. 4 with a part of the mechanism thereof removed.

Briefly, this invention provides a multiple row peanut harvester especially adapted, in this embodiment, to dig 4 rows of peanuts simultaneously and guide the plants into opposing horizontally disposed belts which engage the vines of the plants and convey the plants into the machine. In the primary embodiment of the invention, a multi-wheel tractor towed trailer is provided. The conveyor systems of the device are, in this embodiment, powered through a power takeoff from the tractor. This invention provides a unique and novel belt and drive system which provides efficient and trouble-free operation of the machine and consolidates the rows of peanut plants as they are conveyed rearwardly therethrough. Through a system of belts and guide bars the plants are conveyed gently in a manner which avoids the break up of fragile plants such as the Valencia variety peanut. The device, furthermore, provides a plant inverting feature through novel positioning of belt travel and vine guide rods which fully invert the peanut plants prior to their final consolidation and discharge. The machine produces a windrow at the rear of the machine in which the peanuts are deposited upwardly so that effective discoloration free drying of the plants may take place. The machine furthermore provides a novel windrow forming device comprised of horizontal and vertical wheels at the rear of the machine and provides a moisture draining and air circulating furrow beneath the windrow. Means are also provided to maintain the sheaves of the conveyer clean and free from foreign objects to insure trouble-free operation. The belt conveyor system is also designed as to operate effectively under varying load conditions, a problem which has been found to be especially aggravated in the harvesting of Valencia type peanuts. Adjustments are provided for the conveyer system and the vertical disposition of the device as a whole to enable harvesting of peanuts in many types of soil and in many locations or ground conditions.

*The framework*

Figure 1:
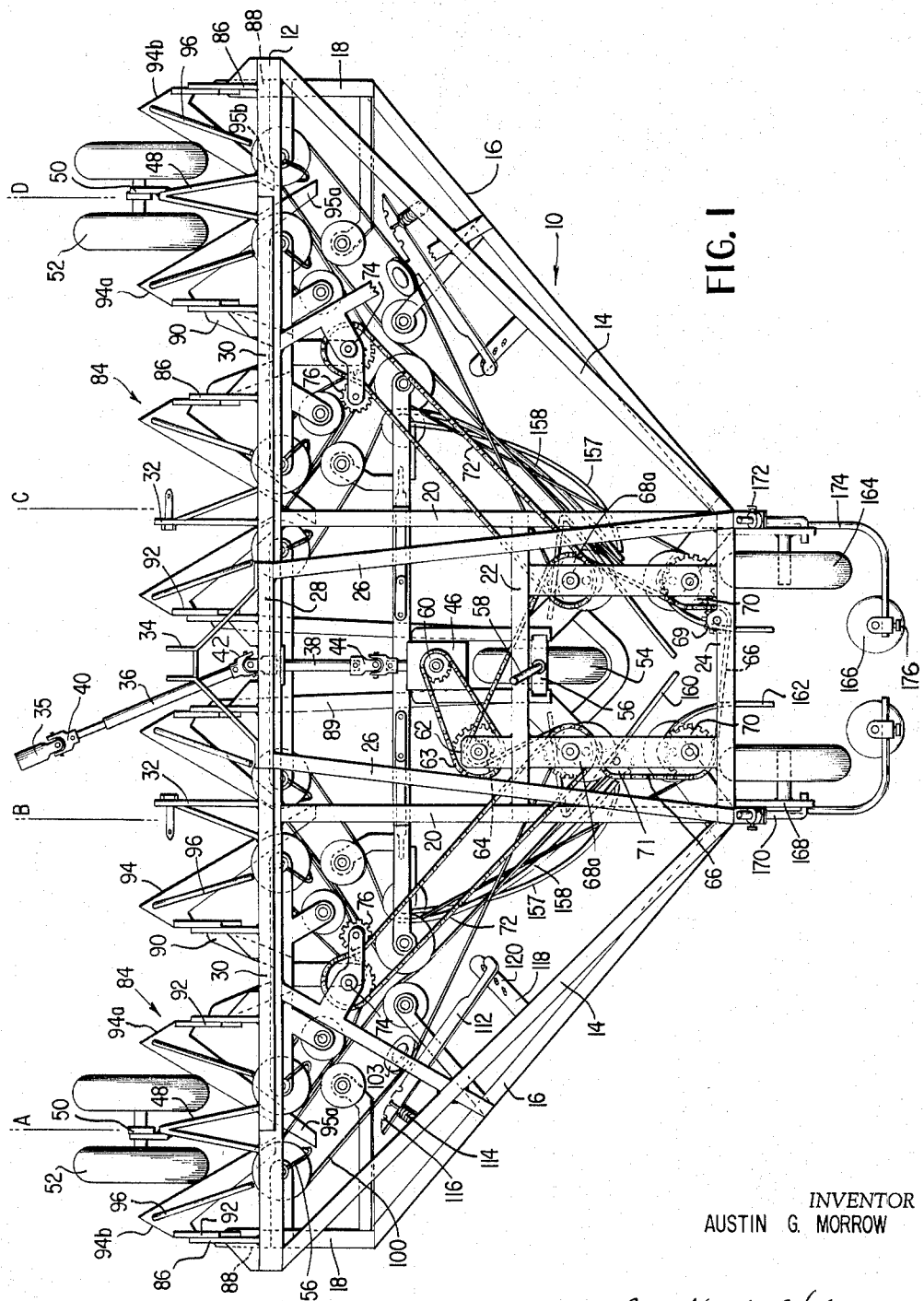
FIG. 1 is a plan view of a harvesting machine employing the present invention.
Figure 2:
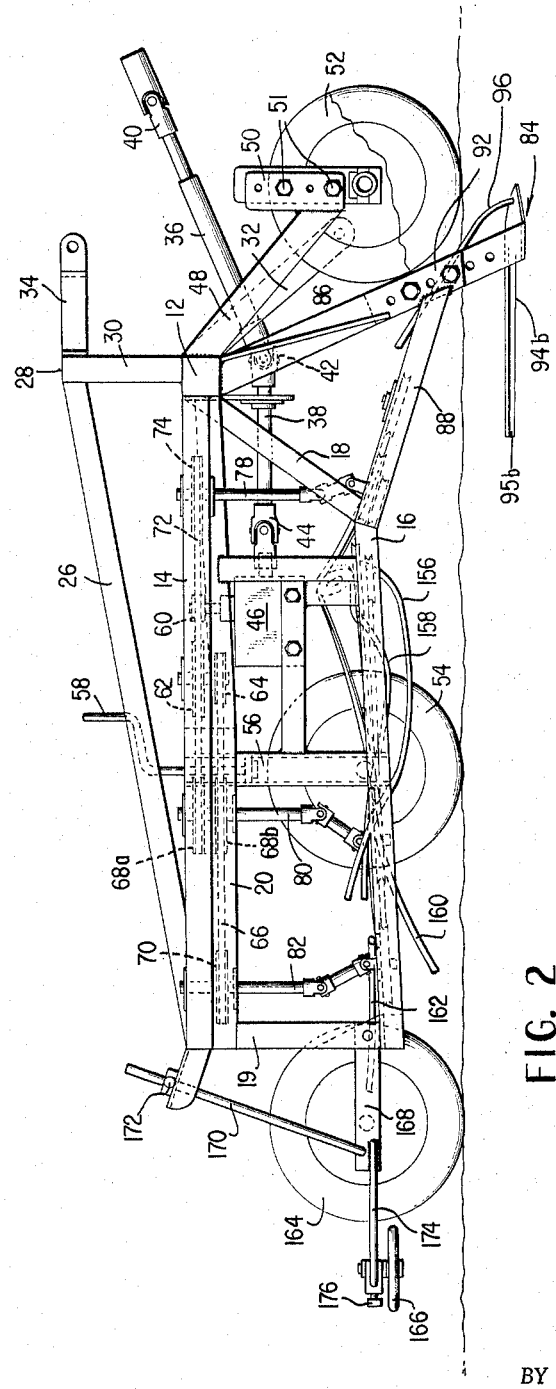
FIG. 2 is a side elevational view of the harvesting machine of FIG. 1.
Figure 3:
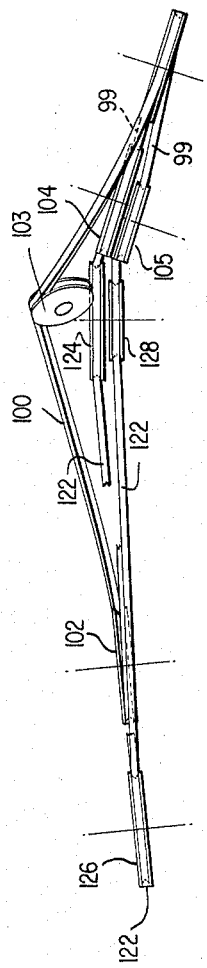
FIG. 3 is a side elevational view in detail showing the conveyor belt system of the present invention with portions broken away in the interest of clarity.

Referring now to FIG. 1 of the drawings, a harvester framework, shown generally at 10, is composed of a transverse bar 12. Connected to the transverse bar and extending rearwardly therefrom are upper diagonal members 14. Lower diagonal members 16 are disposed beneath the upper diagonal members, the diagonal members being connected together by side diagonals 18 and side verticals 19 (FIG. 2). In the center of the frame, longitudinal box members 20 are disposed between upper diagonal 14 and transverse bar 12. The longitudinal box members are connected by a forward transverse box member 22 and a rear transverse box member 24. At the top of the frame mounted on rear transverse box member 24 are forwardly extending longitudinal truss members 26 connected together at the front ends thereof by a transverse horizontal truss member 28. The truss members are connected to and stabilized on transverse bar 12 through transverse diagonal truss members 30.

*Suspension system*

The transverse bar 12 has, depending therefrom, forward wheel struts 48 which are provided with dual wheels 52 to support the main portion of the harvester frame. The struts 48 are provided with height adjustment elements consisting of a pair of apertured plates 50 supported by bolts 51. The height adjustments 51 may be of any type suitable for the purpose and in this embodiment comprises a pair of apertured plates vertically adjustable with respect to one another, the plates being fixed at the desired vertical adjustment bolts 51 (FIG. 2). The harvester has positioned at approximately the center thereof a center-support wheel 54 that is connected to forward transverse box member 22 in frame 10. The support wheel 54 also is provided with a height adjustment device 56 which may consist of, as illustrated in this embodiment, a screw-jack operated by crank 58. The harvester is thus provided with a tricycle type suspension gear, each set of the wheels having individual height adjustments to allow adjustment of the harvester as required for the particular crop to be harvested. A further advantage is realized in the placement of the wheel 54 in that a furrow is pressed by this wheel in the ground. The furrow is disposed beneath the subsequently deposited windrows and provides water drainage and air circulation during the drying of the peanuts.

*Tractor hookup*

The harvesting machine is adapted to be connected to and towed by a tractor (not shown). Connected to transverse bar 12 and transverse horizontal truss member 28 is a three-point tractor hookup. The hookup comprises an upper tractor hitch 34 disposed on the transverse horizontal truss member 28 and lower tractor hitches 32 depending from the transverse bar 12 (FIG. 2) and disposed on either side of the center line of the harvester. Power is supplied to the harvesting machine from a power takeoff on the tractor (not shown) through a coupling 35, a connecting drive shaft 36, and a power transmission box drive shaft 38. The respective drive shafts and couplings are connected to one another through universals 40, 42, and 44. Power, transmitted from the power takeoff, is directed to a power transmission box 46, suitably mounted in the frame 10 as shown for re-transmission as described below.

*Drive system*

The power transmission box is provided with a power transmission sprocket 60 that drives, through a chain 63, large transfer sprocket 62. A small transfer sprocket 64, mounted coaxially and rotatably with sprocket 62, has entrained thereabout a drive chain 66 to drive power divider sprockets 68a and forward-rear drive sprockets 68b (FIG. 2) and rear drive sprockets 70 as shown. Idler sprockets 69 and 71 are mounted in the circuit of rear drive chain 66 and serve to maintain the proper engagement of the drive chains with the adjacent sprockets 70 and 68b respectively. Referring to FIG. 2, the power divider sprockets 68a and forward-rear drive sprockets 68b are mounted coaxially with respect to one another. Sprockets 68a drive forward drive chains 72 which, in turn, drive forward drive sprockets 74. Idler sprockets 76 engage forward drive chain 72 to provide positive engagement of tension for the drive chain with the sprockets 74. Referring again specifically to FIG. 2, forward drive shafts 78 depend from the forward drive sprockets 74, forward-rear shafts 80 depend from the forward-rear drive sprockets 68b and rear drive shafts 82 depend the rear drive sprocket 70. As thus far described, the power system comprises a single takeoff from the power transmission box to a transfer sprocket which, through a single drive chain, drives two pairs of rear drive sprockets. The forward pair of rear drive sprockets also comprise power transfer sprockets which, through a pair of chains, divides power equally between a pair of forward drive sprockets. Power is then taken from the drive system by six drive shafts disposed symmetrically about the center lines of the harvester. The power from these shafts is distributed to a conveyor system disposed beneath the drive system. The operation of the conveyor system will be described below. Through the aforedescribed mechanism power is transmitted efficiently and equally to a drive shaft system. The drive system is disposed in co-planar relationship thereby allowing the use of drive chains to provide efficient, slip-free transmission of the power. The disposition of the drive chain system, above and out of the way of the conveyor system, also provides trouble-free operation of the drive system by avoiding contamination of the chains and sprockets with the dirt, vines and other material generally encountered in the harvesting of the peanut plants.

Vine unearthing apparatus

Depending from and forwardly disposed of the harvester are four pairs of vine unearthing knives shown generally at 84. The knife system is supported by knife support members 86 depending from the transverse bar 12 and braced by end diagonal knife brace 88, intermediate diagonal knife braces 90 and center knife braces 89 (FIG. 1). Knife supports 86 are connected to knives 84 through a height adjusting device 92. The height adjusting device is preferably similar to height adjusting device 50 set forth above in the description of the support for the dual wheels 52. Referring to FIG. 1, knives 94a and 94b are mounted in pairs on either side of the rows of peanuts to be harvested. In this figure the rows are represented by the lines marked A, B, C, and D. The knives, with their inwardly slanting trailing edges 95a and 95b are disposed to pass beneath the respective row of peanuts and sever the peanuts from the ground. The knives are provided with vine pickup rods 96 connected to the upper surface near the forward edge thereof and slanting backwardly towards the harvesting machine as shown. Also, as shown, the knives 94a and 94b are provided with longer and shorter trailing edges 95a and 95b respectively. This configuration of the knives provides a clear, clean passage of the knives totally under the nuts yet allowing trash to pass between them without hanging up on the knives. The relationship between the pickup rods 96 and the knife edges prevents lifting of the vines prior to the freeing of the spike crop there beneath thereby preventing the pulling off of any of the spike crop.

Conveyer system

Referring now to FIG. 4 of the drawings, a partially broken away plan view of the lower portion of the harvester is shown. In the view the upper level including the major portion of the framework and the drive system, including the sprockets and sprocket-chains have been removed for clarity. Also, the conveyer belt system for the right-hand portion of the harvester has been removed to aid in the description of the machine. Since the machine is mirror symmetrical about a center line in the structure, it should be understood that the belt system for the right-hand portion of the harvester is identical to that shown and to be described below for the left-hand portion of the system. Furthermore, vine rods are shown on the conveyer sheaves. These rods were omitted from FIGS. 1 and 2 to enhance the clarity of the description of those figures.

The following description is for the operation of the left-hand portion of the harvesting device and as above indicated, should be understood that the same operation in mirror symmetry occurs in the right-hand portion of the machine. Pickup sheaves 98a and 98b are disposed adjacent each row of peanuts A, B, C and D, as shown. The sheaves 98a are disposed outwardly on either side of the sheaves 98b. The sheaves 98b are driven by drive sheave 104 through a middle belt 99. Referring to FIG. 6 for detail, the drive sheave 104 is shown in elevation mounted eccentrically above a middle belt return sheave 105. The drive sheave is also connected to drive shaft 78 through universal joints 77 and 79. Referring again to FIG. 4, and tracing the path of the middle belt 99 starting in the direction of the arrows with the return sheave 105, the middle belt 99 connects to the pickup sheave 98b for Row A, traverses that pickup sheave counterclockwise, returns, in its drive run, to the drive sheave 104, connects to the pickup sheave 98b for Row B, traversing that sheave in a clockwise direction and returns, in its return run to the middle belt return sheave 105 beneath the drive sheave 104. Middle belt idler sheaves 106 engage the middle belt between the pickup sheave and the drive sheave to provide a backup for the belt during that portion of its travel.

The pickup sheave 98a for Row A is engaged by an outer belt 100 which traverses this sheave in a clockwise direction as shown by the arrows and, tracing its path in the direction of the arrows in its drive run, tracks rearwardly and inwardly, traversing an outer belt drive sheave 102 in a counterclockwise direction and, from there, returns, in its return run, to an outer belt return sheave 103 disposed above and at an angle to the above described sheaves. From there the outer belt 100 returns to the pickup sheave 98a for Row A. An outer belt forward idler sheave 108 and a rear idler sheave 110 backup the outer belt in its transverse between the pickup sheave 98a and the drive sheave 102. Referring to FIG. 1, the return sheave 103 is mounted on a floating bar 112 which, in turn, is connected to the upper diagonal 14 through a spring 114. The spring 114 is longitudinally adjustable on the bar 112 by engagement with the desired one of notches 116 disposed therealong. The floating bar 112 is engaged at the other end thereof with an adjustment 118 through adjusting stops 120. The above-described device provides means to adjust the tension of the outer belt 100 through change of spring tension in the circuit by the proper location of the floating bar 112.

Referring to FIG. 5, the drive sheave 102 is connected to the drive shaft 80 through a pair of universal joints 81 and 83 as shown to provide drive for the outer belt system.

The pickup sheave 98a for Row B is engaged by an inner belt 122, and tracing the course of the drive run of this belt in the direction of the arrows, is traversed in a counterclockwise direction thereby. The belt 122, traversing an intermediate sheave 124 in a counterclockwise direction, crosses over the outer belt 100 and engages an inner belt drive sheave 126 in a counterclockwise direction. From there the belt, in its return run, 122 crosses under itself and the outer belt 100 engages an inner belt return sheave 128 and returns to the pickup sheave 98b. The inner belt is provided with an idler sheave 130 to back up the belt between its traverse from the pickup sheave 98b to the intermediate sheave 124. Referring to FIG. 7, inner belt drive sheave is shown in detail. It is connected through a pair of universal joints 85 and 86 to the drive shaft 82 to provide drive for the inner belt system. The belt 122 is also provided with a spring tensioning device, shown generally at 132. This provides adjustment of slack in the inner belt system. Referring particularly to FIGS. 8, 9 and 10, the tensioning device 132 is shown in detail. The devices are mounted on a sheave support 134 which, in turn is mounted on the center knive braces 89. A track member 136 is attached to the end of the support 134 and slidably supports a sheave mount 138 therein. A sheave bracket 140 is attached to the mount 138 and rotatably supports the sheave 128. A tension adjusting arm 142 is slidably and pivotally secured to the sheave support 134 by a pin 144 disposed through a slot 146 in the support. The arm 142 is also pivotally connected to a link 148 which is, in turn, also pivotally connected to the sheave support 134. A compression spring 150 is connected o and disposed between a depending portion of the pin 144 and the slidable sheave mount 138. A spring retainer 152, coaxially disposed through the spring 150 and through a bore in the depending portion of pin 144 retains the spring in alignment. When increased tension is required on belt 122, actuation of the arm 142 in the direction of the arrow (FIG. 9) increases the compression in the spring 150, biasing the sheave 128 against the return segment of the belt 122 thereby increasing the tension therein.

FIG. 11 includes a detail of the sheaves 98b. This sheave is provided with vine rods 154 and is typical of certain of the sheaves throughout the device as may be seen by reference to FIG. 4. These rods may be disposed pointing counterclockwise around the bottom of the sheave as in FIG. 11, clockwise around the top and bottom of the sheave 102 (FIG. 5), counterclockwise around the top of the sheave (sheave 108, FIG. 4) or in any other combination of directions as required. The layout of the rods 104 may be seen by reference to the remaining sheaves in FIG. 4. For example, the disposition of the vine rods on the sheaves in outer belt 100 is as follows: the sheave 98a has vine rods on the bottom pointing counterclockwise, sheave 108; top, counterclockwise, sheave 110; bottom, counterclockwise. The sheaves on the right-hand side of the machine are mirror images of those on the left and their vine rods are therefore disposed in exactly the opposite directions.

The vine rods operate to provide firm and positive engagement with the plants passing by the sheave points. These rods are especially useful at the pickup, discharge and vine transfer points where the grip of the belt system tends to be loose.

Referring again to FIG. 11, the sheave detail also inludes a sheave cleaner 156, typical of many such cleaners throughout the conveyor system as may be seen by reference to FIG. 1. For clarity, these cleaners were omitted from FIG. 4. A common problem in harvesting machines is the accumulation of dirt and other foreign matter in the belt sheaves. This accumulation ultimately causes the belts to untrack from the sheaves resulting in a breakdown of the mechanism. These cleaners, disposed in the sheaves where such problems are most likely to occur and pointed against the direction of rotation of the sheave, provide continuous cleaning of the sheaves, thereby avoiding the problem of belt untracking.

*Plant guide system*

In addition to the conveying system described above, this invention provides a system of guides to aid the conveyors in handling and windrowing the harvested crop. In addition to the vine pickup rods 96 which fold the vines of the plants into the pickup sheaves 98a and 98b, nut lifting aid rods 157 and 158 are provided proximate the point of crossover between the outer belt 100 and the inner belt 122 (FIGS. 1 and 2). These rods aid the conveyor belts in lifting the heavy nuts outwardly and upwardly during the turnover of the plant, which occurs at that point. Disposed slightly behind the rods 157 and 158 are windrow vine guide rods 160 followed by windrow nut guide rods 162 disposed on either side of the discharge point. These rods preform the discharged plants for windrowing. Following the guide rods are the vine pressure wheels 164 and the nut pressure wheels 166. The wheels 164 are mounted to the frame 10 by pivotal side bars 168 and rods 170 (FIG. 2). The length of the rod 170, and, therefore, the horizontal disposition of the wheels 164, is adjustable through a lockscrew 172.

The wheels 166 are mounted on horizontal brackets 174 and their disposition, relative to one another, is adjustable through lock screws 176 (FIGS. 1 and 2).

*Operation*

In operation, the harvester, suitably connected to a tractor at the hookup points 32 and 34 and with its conveyer power train connected to the tractor power take-off at the coupling 35, is suitably adjusted for height or depth of the crop through the adjusting devices 50, 92, 58 and 172. The machine is disposed with each of the pairs of knives 84 straddling a row of peanut plants. As the tractor moves forward, the knives 94 cut under each row of peanut plants separating them from the earth. Simultaneously the vine pickup rods 96 fold the peanut vines into the pickup sheaves 98a and 98b for the respective rows. Referring to FIG. 4, the sheaves feed the vines for Row A, between the outer belt 100 and the middle belt 99 and for Row B, the inner belt 122 and the middle belt 99. From this point, as can be seen in FIG. 2, the peanuts are lifted from the ground by their vines and conveyed upward and backward to the point of conjunction of the outer belt 100 and the inner belt 122. At this point the plants from Row A and Row B are merged and fed between the outer and inner belts. As the outer and inner belts cross one another in their rearward travel, the plants conveyed therebetween are forced to invert 180°. The nut lifting rods 157 and 158 (FIGS. 1 and 2) aid the belts in inverting the plants by deflecting the nuts up and outwardly. The plants are then discharged to merge with a similar stream of plants from Rows C and D between the windrow vine guide rods 160 and the windrow nut guide 162 which preliminarily shape the windrow. The vine pressure wheels 164 then compress the outer edges of the vines down, pressing the base of the windrow and the vine pressure wheels compact the nut portion of the windrow. As before described, the center support wheel 54 has formed a furrow in line with the windrow and the furrow provides drainage and air circulation for the windrow.

This device thereby provides an inverted windrow of peanuts or like plants from four separate rows of growing plants in an efficient, durable and trouble-free manner and simultaneously provides for drainage and air circulation for drying the windrowed plants. This device also provides windrowing of the type of peanut that heretofore have not been readily harvestable by machine.

Any materials suitable for the purpose may be utilized in the construction of the machine. The frame and structural parts may be fabricated from welded channel steel or the like. Aluminum or other structural material may, of course, be used if desired. The conveyer system is composed of standard shelf stock sheaves and V belts of a type and size suitable for the individual load and directional requirements needed. The sheaves are modified by welding or otherwise suitably attaching the vine rods where indicated. The wheels, bearings, springs, universals, sprockets, chains, and the like are of standard design and may be conventional shelf items if desired.

What is primarily provided is a harvester which effectively digs and lifts peanuts and other plants into its conveyer system with a new and unique blade and guide rod combination, conveys and inverts a plurality of rows of plants in a unique trouble-free belt system in which the stream of plants is continuously in contact with the belts and which, through the design and placement of its novel and unique drive system, furnishes a high amount of power with a minimum of maintenance to the belt conveyer. The design of the machine, furthermore, provides a system where a chain sprocket drive can replace the less efficient belt drive of prior machines of this type.

Obviously many modifications and variations of the invention can be made in the light of the above teachings. What is set forth above is merely examplary of an embodiment of the invention to enable those skilled in the art to understand the practice thereof. It should, therefore, be understood that the invention may be practiced otherwise than that as specifically set forth above.

What is claimed new and desired to be protected by Letters Patent of the United States is:

I claim:

1. A harvester and windrower comprising in combination:
   (A) a frame having ground engaging wheels thereon,
   (B) a plurality of pairs of plant digging blades depending from said frame, each of said pairs of blades being disposed to pass beneath a row of plants on opposite sides thereof to sever the plants from the ground, one pair of blades being positioned with to another pair of blades to define a conveyor feeding unit,
   (C) a horizontally opposed belt conveyor system for each of said units, said system comprising:
      (1) a rearwardly feeding first endless belt and sheave conveyor, the conveying path of said first conveyor extending from a point proximate one of said pairs of blades to a discharge point at the rear center of said harvester,
      (2) a rearwardly feeding second endless belt and sheave conveyor, the conveying path of said second conveyor extending from a point proximate the other of said pairs of blades to said discharge point, (3) a third endless belt and sheave conveyor disposed between said first and second conveyors, the conveying path of said third conveyor extending from points proximate both of said pairs of blades to a merging point intermediate the ends of the conveying path of said first and second conveyors, (4) said third conveyor being disposed so that a portion of the drive run thereof cooperates with said first conveyor to engage and convey plants received from said one pair of blades to said merging point and a portion of the return run thereof cooperates with said second conveyor to engage and convey plants received from said other pair of blades to said merging point, (5) said first and second conveyors being disposed to cross one another between said merging point and said discharge point and to cooperate with one another to engage, invert and convey plants therebetween from said merging point to said discharge point, (D) means to drive said conveyors, and (E) means disposed at said discharge point to form said plants in a windrow behind said harvester.

2. A harvester and windrower for subsurface bearing plants and for connection to a towing tractor comprising:

(A) a trailer frame having a pair of first ground engaging support wheels mounted on either side of the front end thereof, a second ground engaging support wheel mounted proximate the center of said frame, said second wheel being positioned to press a furrow in the ground over which it passes, (B) a plurality of pairs of plant digging blades depending from the front of said frame, each of said pairs of blades being disposed to pass beneath a row of plants on opposite sides thereof to sever the plants from the ground, one pair of blades being positioned with respect to another pair of blades to define a conveyor feeding unit, (C) a horizontally opposed belt conveyor system for each of said units, said system comprising:

(1) a rearwardly feeding first endless belt and sheave conveyor, the conveying path of said first conveyor extending from a point proximate one of said pairs of blades to a discharge point at the rear center of said harvester, (2) a rearwardly feeding second endless belt and sheave conveyor, the conveying path of said second conveyor extending from a point proximate the other of said pairs of blades to said discharge point, (3) a third endless belt and sheave conveyor disposed between said first and second conveyors, the conveying path of said third conveyor extending from points proximate both of said pairs of blades to a merging point intermediate the ends of the conveying path of said first and second conveyors, (4) said first, second and third conveyors being disposed with respect to one another to cooperate to engage and convey plants received from said blades to said merging point, (5) said first and second conveyors being disposed to cross one another between said merging point and said discharge point and to cooperate with one another to engage, invert and convey plants therebetween from said merging point to said discarge point, (6) resilient belt tensioning means associated with said first and second conveyors, (7) at least one of the sheaves of said conveyors having a plurality of plant engaging vine rods radially disposed and extending from a horizontal surface thereof, said rods being curved in the direction of rotation of said one sheave, (D) a drive system disposed above said conveyor, said system comprising:

(1) means to connect said drive system to a towing vehicle power takeoff, (2) a drive sprocket driven by said means to connect said drive system, (3) a plurality of driven sprockets, at least one of said driven sprockets being disposed above a sheave for each of said conveyors, (4) drive chains connecting said driven sprockets to said drive sprocket, (5) a drive shaft connecting each of said driven sprockets to a sheave disposed therebeneath, (6) a double universal joint link in at least one of said drive shafts, (E) means at said discharge point to form said plants in a windrow over the furrow formed by said second wheel, said means comprising:

(1) a pair of ground engaging vine pressure wheels disposed on either side of said discharge point to press the discharged plant vine portions in a windrow, and (2) a pair of horizontally disposed fruit pressure wheels located on either side of said discharge point above said vine pressure wheels to gently press the discharged plant fruit portions in the windrow.

3. A peanut harvester and windrower for connection to a towing tractor comprising:

(A) a trailer frame having a pair of dual ground engaging support wheels mounted on either side of the front end thereof, a single ground engaging support wheel mounted proximate the center of said frame, said single wheel being positioned to press a furrow in the ground over which it passes, means associated with each of said wheels to vary the height of said frame from the ground, (B) a plurality of plant digging blades depending from the front of said frame, each of said blades comprising an elongated essentially horizontal cutting structure having a front and trailing end thereto, each of said blades having a vine lifting rod mounted proximate the front end thereof, said rods being slanted upwardly toward the rear of said blades, each of said blades further being paired with another of said blades to define a rearwardly pointing, essentially V-shaped structure disposed to pass beneath a row of plants on opposite sides thereof to sever the plants from the ground, one of the paired blades having the trailing end thereof extending behind and in spaced relation to the trailing end of the other of the paired blades to form a passage for foreign matter therebetween, and a support member disposed proximate the front end of said blades to connect said blades to said frame, said support member including means to adjust the vertical disposition of said blades with respect to said frame, one pair of blades being positioned wtih respect to another pair of blades to define a conveyor feeding unit, (C) a horizontally opposed belt conveyor system for each of said units, said system comprising:

(1) a rearwardly feeding first endless belt and sheave conveyor, the conveying path of said first conveyor extending from a pickup point proximate one of said pairs of blades to a discharge point at the rear center of said harvester, (2) a rearwardly feeding second endless belt and sheave conveyor, the conveying path of said second conveyor extending from a pickup point proximate the other of said pairs of blades to said discharge point, (3) a third endless belt and sheave conveyor disposed between said first and second conveyors;

the conveying path of said third conveyor extending from points proximate both of said pickup points to a merging point intermediate the ends of the conveying path of said first and second conveyors; said first, second and third conveyors being disposed with respect to one another to cooperate to engage and convey plants from said pickup point to said merging point, (4) said first and second conveyors being disposed to cross one another between said merging point and said discharge point and to cooperate with one another to engage, invert and convey plants therebetween from said merging point to said discharge point, (5) said first conveyor having a pickup sheave disposed adjacent said pickup point, a first idler sheave for backing up said belt between said pickup point and said merging point, a second idler sheave for backing up said belt at said merging point, a drive sheave disposed proximate said discharge point and an angularly disposed return sheave engaging said belt for return travel thereof, said return sheave having means associated therewith to vary the engaging force with said belt to adjust the tension therein, (6) said second conveyor having; a pickup sheave disposed adjacent said pickup point, a first idler sheave for backing up said belt between said pickup point and said merging point, a second idler sheave for supporting said belt at said merging point, a drive sheave disposed adjacent said discharge point and a return sheave engaging the return segment of said belt, said return sheave having means associated therewith for altering the engaging force with said belt to vary the tension thereof, (7) said third conveyor having; a pair of pickup sheaves, one of said pair of sheaves being disposed adjacent each of said pickup points to cooperate with the pickup sheaves of said first and second conveyors to engage therebetween the vine of plants received from said blades, idler sheaves to back up said belt between each of said pickup points and said merging point, a drive sheave disposed at said merging point, and a return sheave disposed eccentrically beneath said drive sheave for engaging said belt at the return portion thereof, (8) vine rods disposed on:
 (a) the lower surface of said pickup sheaves,
 (b) the upper surface of said first idler sheaves,
 (c) the lower surface of said second idler sheaves,
 (d) and the upper and lower surfaces of the drive sheaves of said first and second conconveyors,
 (e) said vine rods comprising essentially radially extending rods curving in the direction of rotation of the sheave for which they are mounted, said rods engaging portions of the plants passing between said sheaves,
 (f) sheave cleaning members mounted on at least the pickup sheaves of said conveyors, (D) a drive system disposed above said conveyor system comprising:
 (1) a connecting shaft including at least one universal joint to connect said drive system to a towing vehicle power takeoff,
 (2) a power transfer box driven by said connecting shaft,
 (3) a drive sprocket mounted on said power transfer to be driven thereby,
 (4) a power transfer sprocket unit comprising a driven sprocket and a drive sprocket mounted coaxially and rotatably therewith,
 (5) a first drive chain connecting the driven sprocket of said power transfer sprocket unit to said drive sprocket,
 (6) at least one rear forward drive sprocket,
 (7) at least one rear rear drive sprocket,
 (8) a second drive chain connecting said rear forward drive sprocket and said rear rear drive sprocket to the drive sprocket of said power transfer sprocket unit,
 (9) a first drive shaft connecting said rear forward sprocket to the drive sheave of said first conveyor,
 (10) a second drive shaft connecting said rear sprocket to the drive sheave of said second conveyor,
 (11) a forward drive sprocket mounted coaxially and rotatably with said rear forward drive sprocket,
 (12) a forward driven sprocket,
 (13) a third drive chain connecting said forward drive sprocket to said forward driven sprocket,
 (14) a third drive shaft connecting said forward driven sprocket to the drive sheave of said third conveyor,
 (15) each of said drive shafts including a double universal unit mounted therein, (E) a pair of essentially arcuate, inclined nut lifting rods disposed beneath the crossover point of the first and second conveyor belts to aid said belts in lifting the plant peanuts during inversion of the plants, (F) means at said discharge point to form said plants in a windrow over the furrow formed by said second wheel, said means comprising:
 (1) a pair of ground engaging vine pressure wheels disposed on either side of said discharge point to press the discharged plant vine portions in a windrow, and
 (2) a pair of horizontally disposed nut pressure wheels located on either side of said discharge point above said vine pressure wheels to press the discharge plant peanut portions in the windrow.

4. A peanut harvester in accordance with claim 3 wherein eight plant digging blades depend from said frame to comprise two conveyor feeding units, and wherein said means at said discharge point to form said plants in a windrow further comprises vine pressure rods disposed adjacent the discharge points of the conveyor systems, said vine pressure rods disposed with respect to one another to form an essentially open bottomed, rearwardly pointing V to align the vines of the plants discharged from the conveyer systems in a windrow, and a pair of arcuate nut pressure rods disposed above and behind said vine pressure rods, said nut pressure rods disposed with respect to one another to form the nuts of said plants in an even row on the top of the windrow.

5. In a multi-row plant harvester having a pair of plant digging blades defining a unit for simultaneously harvesting each row:

(A) a horizontally opposed belt conveyor system for each of said units, said system comprising:
 (1) a rearwardly feeding first endless belt and sheave conveyor, the conveying path of said first conveyor extending from a point proximate one of said pairs of blades to a discharge point at the rear center of said harvester,
 (2) a rearwardly feeding second endless belt and sheave conveyor, the conveying path of said second conveyor extending from a point proximate the other of said pairs of blades to said discharge point,
 (3) a third endless belt and sheave conveyor disposed between said first and second conveyors, the conveying path of said third conveyor extending from points proximate both of said pairs of blades to a merging point intermediate the ends of the conveying path of said first and second conveyors,
(4) said third conveyor being disposed so that a portion of the drive run thereof cooperates with said first conveyor to engage and convey plants received from said one pair of blades to said merging point and a portion of the return run thereof cooperates with said second conveyor to engage and convey plants received from said other pair of blades to said merging point,
(5) said first and second conveyors being disposed to cross one another between said merging point and said discharge point and to cooperate with one another to engage, invert and convey plants therebetween from said merging point to said discharge point, and
(B) means to drive said conveyors.

6. In a multi-row plant harvester having a pair of plant digging blades defining a unit for simultaneously harvesting each row:
(A) a horizontally opposed belt conveyor system for each of said units, said system comprising:
(1) a rearwardly feeding first endless belt and sheave conveyor, the conveying path of said first conveyor extending from a point proximate one of said pairs of blades to a discharge point at the rear center of said harvester,
(2) a rearwardly feeding second endless belt and sheave conveyor, the conveying path of said second conveyor extending from a point proximate the other of said pairs of blades to said discharge point,
(3) a third endless belt and sheave conveyor disposed between said first and second conveyors, the conveying path of said third conveyor extending from points proximate both of said pairs of blades to a merging point intermediate the ends of the conveying path of said first and second conveyors,
(4) said third conveyor being disposed so that a portion of the drive run thereof cooperates with said first conveyor to engage and convey plants received from said one pair of blades to said merging point and a portion of the return run thereof cooperates with said second conveyor to engage and convey plants received from said other pair of blades to said merging point,
(5) said first and second conveyors being disposed to cross one another between said merging point and said discharge point and to cooperate with one another to engage, invert and convey plants there between from said merging point to said discharge point,
(6) resilient belt tensioning means associated with said first and second conveyors,
(7) at least one of the sheaves of said conveyors having a plurality of plant engaging vine rods radially disposed and extending from a horizontal surface thereof, said rods being curved in the direction of rotation of said one sheave,
(B) a drive system disposed above said conveyor, said system comprising:
(1) means to connect said drive system to a towing vehicle power takeoff,
(2) a drive sprocket driven by said means to connect said drive system,
(3) a plurality of driven sprockets, at least one of said driven sprockets being disposed above a sheave for each of said conveyors,
(4) drive chains connecting said driven sprockets to said drive sprocket,
(5) a drive shaft connecting each of said driven sprockets to a sheave disposed therebeneath,
(6) a double universal joint link in at least one of said drive shafts.

7. In a multi-row plant harvester having a pair of plant digging blades defining a unit for simultaneously harvesting each row:
(A) a horizontally opposed belt conveyor system for each of said units, said system comprising:
(1) a rearwardly feeding first endless belt and sheave conveyor, the conveying path of said first conveyor extending from a pickup point proximate one of said pairs of blades to a discharge point at the rear center of said harvester,
(2) a rearwardly feeding second endless belt and sheave conveyor, the conveying path of said second conveyor extending from a pickup point proximate the other of said pairs of blades to said discharge point,
(3) a third endless belt and sheave conveyor disposed between said first and second conveyors; the conveying path of said third conveyor extending from points proximate both of said pickup points to a merging point intermediate the ends of the conveying path of said first and second conveyors; said first, second and third conveyors being disposed with respect to one another to cooperate to engage and convey plants from said pickup point to said merging point,
(4) said first and second conveyors being disposed to cross one another between said merging point and said discharge point and to cooperate with one another to engage, invert and convey plants therebetween from said merging point to said discharge point,
(5) said first conveyor having; a pickup sheave disposed adjacent said pickup point, a first idler sheave for backing up said belt between said pickup point and said merging point, a second idler sheave for backing up said belt at said merging point, a drive sheave disposed proximate said discharge point and an angularly disposed return sheave engaging said belt for return travel thereof, said return sheave having means associated therewith to vary the engaging force with said belt to adjust the tension therein,
(6) said second conveyor having; a pickup sheave disposed adjacent said pickup point, a first idler sheave for backing up said belt between said pickup point and said merging point, a second idler sheave for supporting said belt at said merging point, a drive sheave disposed adjacent said discharge point and a return sheave engaging the return segment of said belt, said return sheave having means associated therewith for altering the engaging force with said belt to vary the tension thereof.
(7) said third conveyor having; a pair of pickup sheaves, one of said pair of sheaves being disposed adjacent each of said pickup points to cooperate with the pickup sheaves of said first and second conveyors to engage therebetween the vines of plants received from said blades, idler sheaves to back up said belt between each of said pickup points and said merging point, a drive sheave disposed at said merging point, and a return sheave disposed eccentrically beneath said drive sheave for engaging said belt at the return portion thereof,
(8) vine rods disposed on:
(a) the lower surface of said pickup sheaves,
(b) the upper surface of said first idler sheaves,
(c) the lower surface of said second idler sheaves, and (d) the upper and lower surfaces of the drive sheaves of said first and second conveyors,
(e) said vine rods comprising essentially radially extending rods curving in the direction of rotation of the sheave for which they are mounted, said rods engaging portions of the plants passing between said sheaves,
(f) sheave cleaning members mounted on at least the pickup sheaves of said conveyors, and (B) means to drive said conveyors.

References Cited by the Examiner

UNITED STATES PATENTS

| | | | |
|---|---|---|---|
| 1,789,563 | 1/1931 | Quinan | 56—229 |
| 2,291,093 | 7/1942 | Hurst et al. | 171—61 |
| 2,525,018 | 10/1950 | Corwin | 171—61 X |
| 2,973,816 | 3/1961 | Van der Lely et al. | 171—61 X |
| 3,024,849 | 3/1962 | Gregory | 171—61 |

ABRAHAM G. STONE, *Primary Examiner.*

ANTONIO F. GUIDA, *Examiner.*